March 10, 1970 M. C. BURK 3,500,151
SEARCH PREVENTATIVE SERVOAMPLIFIERS
Filed Oct. 18, 1966 2 Sheets-Sheet 1

INVENTOR
M. C. BURK
BY *Young & Quigg*
ATTORNEYS ated Mar. 10, 1970

United States Patent Office 3,500,151
Patented Mar. 10, 1970

3,500,151
SEARCH PREVENTATIVE SERVOAMPLIFIERS
Marvin C. Burk, Bartlesville, Okla., assignor to Phillips Petroleum Company, a corporation of Delaware
Filed Oct. 18, 1966, Ser. No. 587,458
Int. Cl. H02p 1/22
U.S. Cl. 318—18    3 Claims

ABSTRACT OF THE DISCLOSURE

Oscillatory searching effects in servomechanism applications are prevented by utilization of servoamplifiers which require a minimum threshold activation signal in order to allow them to transmit power to a servomechanism.

---

Figure 1:
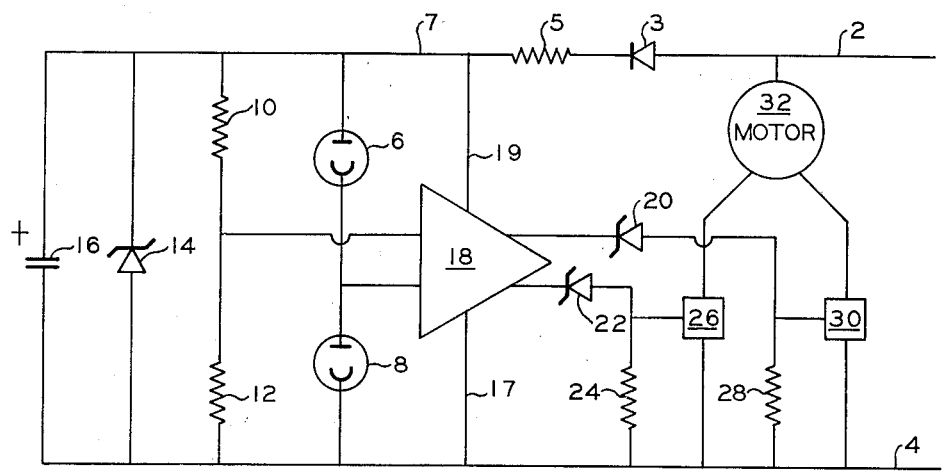

This invention relates to servoamplifiers. In one of its aspects, it relates to an amplifier for a servomotor wherein the output from the amplifier is controlled to prevent operation of the servomotor until a predetermined magnitude of signal is obtained.

Broerman et al., 2,886,715 discloses and claims a differential refractometer in which a light is refracted by passing the same through a refractometer cell. The refracted light is impinged on 2 photocells. Between the photocells and the refractometer cell is positioned a refracto block which refracts the light onto the photocells. When light is refracted by liquid in the refractometer cell it will fall more on one photocell than on the other. An unbalance is thus created in an electrical circuit containing the photocells and a signal is accordingly amplified and sent to a servomotor to rotate the refractometer cell block until light falls evenly on each photocell again. The amount which the motor rotates is representative of the refractive quality of the liquid being measured in the refractometer cell.

When a liquid is being continuously measured for composition and the composition slightly changes, the difference will be detected in the differential refractometer. An amplified signal actuates the servomotor to correct for the refractive difference and in so doing causes an overcorrection which in turn causes the servomotor to turn back in the opposite direction. A cyclic "searching" of the refractometer occurs. This searching is time-consuming as well as causes undue wear on the refractometer apparatus.

I have now discovered that proper adjustment can be made to a differential refractometer by a servomotor if the output from the servoamplifier is controlled so that a fixed differential is required to actuate the servomotor.

By various aspects of this invention one or more of the following or other objects can be obtained.

It is an object of this invention to provide a servoamplifier for a servomotor.

It is a further object of this invention to provide an improved method for operating a servomotor to prevent searching.

It is a further object of this invention to provide an improved refractometer wherein the index of refraction of fluids measured by the refractometer are measured by adjusting a servomotor.

It is a still further object of this invention to improve the life and reduce wear of a servomotor.

Further aspects, objects, and the several advantages of this invention are apparent to one skilled in the art from a study of this disclosure, the drawings, and the appended claims.

According to the invention there is provided an actuation means for a servomotor. The actuation means delivers a signal to the servomotor responsive to a signal supplied by a signal developing means, and there is provided a control means to prevent a servomotor from being actuated until a predetermined threshold signal is developed from said signal developing means.

In one embodiment a circuit unbalance signal is amplified in a direct coupled differential amplifier and the output from the differential amplifier is passed through Zener diodes which prevent the motor from being actuated until a predetermined differential is obtained from the amplifier.

Figure 2:
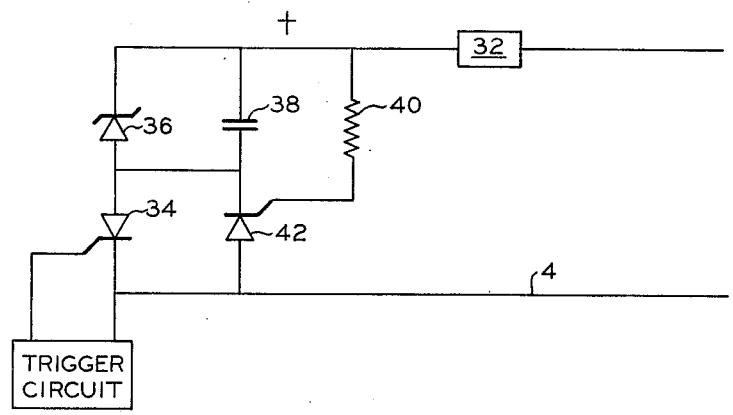
Figure 3:
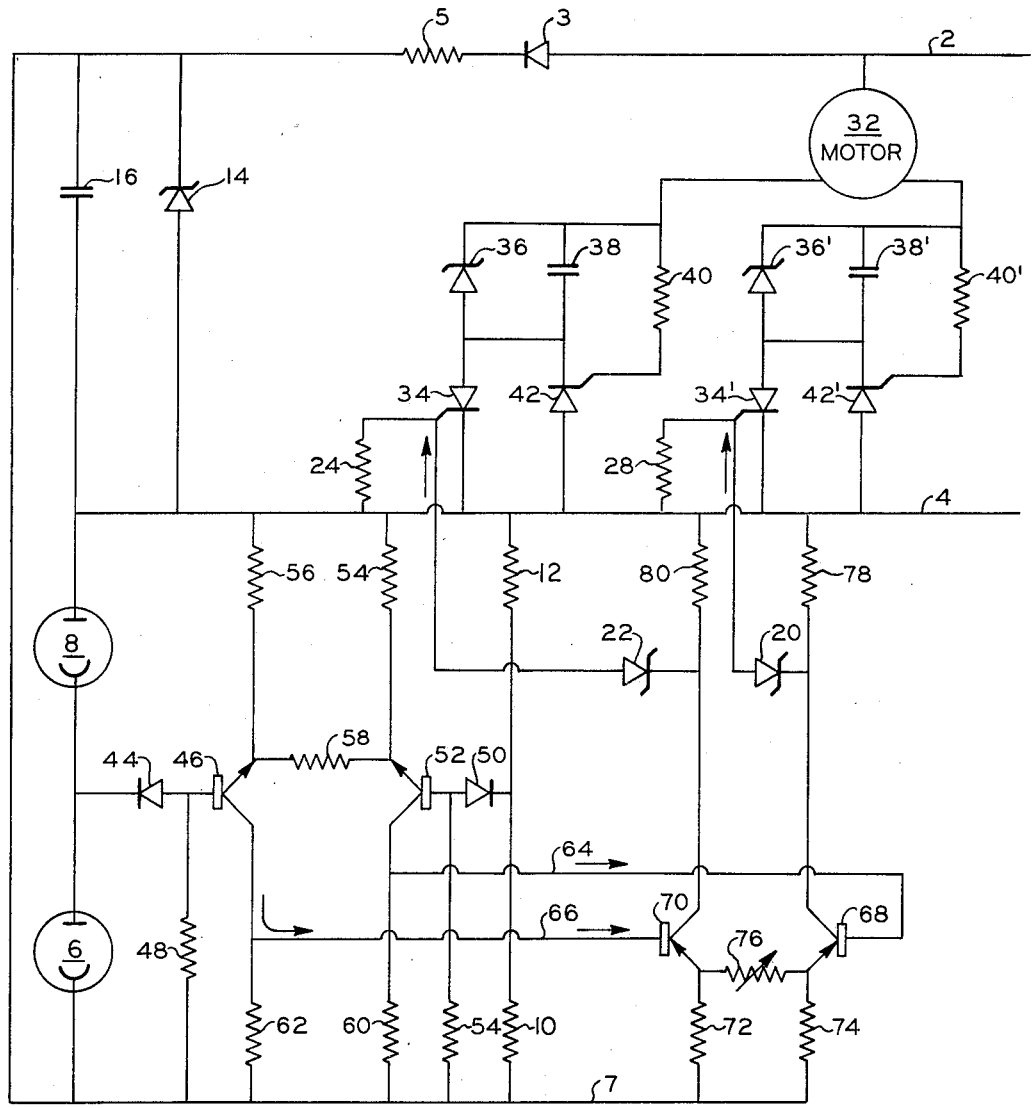

The invention will now be described with reference to the accompanying drawings in which FIGURE 1 is a schematic block diagram of a circuit according to the invention; FIGURE 2 is a schematic of a circuit used in one of the blocks of FIGURE 1; and FIGURE 3 is a schematic circuit diagram of the block diagram shown in FIGURE 1.

Referring now to the drawings, an AC signal is connected to lead 2 which has in it diode 3 which rectifies the current, and resistor 5 which with condenser 16 serves as a filter. Zener diode 14 provides voltage regulation. A rectified signal is applied to a balance circuit which is composed of resistance 10, resistance 12, photoelectric sensing device 6 and photoelectric sensing device 8. The output from the bridge circuit is amplified in a differential amplifier 18 and the output from the differential amplifier 18 is connected to Zener diodes 20 and 22. Power is supplied to amplifier 18 by the connection of lead 19 to the rectified current line. Lead 17 references the signal to amplifier 18 to AC common 4. Zener diode 22 is connected to AC common 4 by resistor 24 and Zener diode 20 is connected to AC common 4 by resistor 28. The Zener diodes are set so that they will not pass a signal until a predetermined potential with respect to common 4 is reached. After the threshold voltage is reached, a signal passes through either diode 20 or 22 to switch 30 or switch 26 which in turn applies a signal current to motor 32 to cause the motor to turn in one direction or the other depending on which switch 26 or 30 has passed current through it.

Referring now to FIGURE 2 which shows a detailed schematic of the switch 26 or 30, there is provided a silicon controlled rectifier 34 which is connected to AC common 4 and Zener diode 36. Capacitor 38 is shunted across Zener diode 36. Resistor 40 is connected to the connection of capacitor 38 and Zener diode 36 and SCR 42 at one end and to silicon controlled rectifier 42 at the other end. SCR 42 is also connected to the motor 32, and the junction between Zener diode 36 and capacitor 38 at one end and at the other end to AC common 4.

In operation, the switch is triggered by a pulse passing through Zener diode 22, for example, which fires SCR 34 during the positive half of the cycle. This causes capacitor 38 to charge to the voltage equal to the voltage drop across Zener diode 36. During the negative half of the cycle, no current flows through diode 34 and capacitor 38 discharges through resistor 40 and fires SCR 42 to cause current to flow into control winding of motor 32 through SCR 42 and Zener diode 36.

Referring now to FIGURE 3, the outputs from the bridge circuit composed of photoelectric elements 6 and 8 and resistors 10 and 12 are connected at one end to diode 44, NPN transistor 46 whose base is connected to diode 44, and to lead 7 through resistor 48. The emitter from transistor 46 is connected to AC common 4 by resistor 56 whereas the collector from transistor 46 is connected to lead 7 by resistor 62. A similar arrangement on the other side of the output from the bridge circuit comprises diode 50 connected to lead 7 by resistor 54. NPN transistor 52, whose base is connected to diode 50, with the emitter, is connected to AC common 4 by resistor 54 and whose collector is connected to lead 7 by resistor 60. A resistor 58 is connected to the emitter of transistor 46 and the emitter of transistor 52. Resistance 58 can be varied or selected to give a desired gain from the amplifier. The output signal from the bridge circuit, after passing through transistors 46 and 52, passes through leads 66 and 64 to a differential or push-pull circuit which comprises PNP transistors 70 and 68 whose emitters are connected by resistors 72 and 74 to lead 7, respectively. A variable resistance 76 is connected to the emitters between transistors 68 and 70. The collectors of transistors 68 and 70 are connected to AC common 4 by resistors 78 and 80, respectively. The collector output from transistors 68 and 70 are also connected to Zener diodes 20 and 22 ahead of resistors 28 and 24, respectively. Zener diode 22 triggers a switch consisting of SCR 34, Zener diode 36, capacitor 38, resistor 40 and SCR 42 (as has been explained with relation to FIGURE 2) when the potential difference between collector output of transistor 70 and collector output of transistor 68 exceeds a predetermined minimum. Similarly when the potential at the collector of transistor 68 becomes sufficiently greater than the potential of collector of transistor 70, current will flow through Zener diode 20 to a switch circuit similar to that described with relation to FIGURE 2, the switch circuit consisting of SCR 34', Zener diode 36', capacitor 38', resistor 40' and SCR 42'. Thus, when the differential output from the collectors of transistors 68 and 70 exceed a predetermined minimum, current will flow through either Zener diode 22 or Zener diode 20 to actuate a switch which will cause servomotor 32 to rotate in one direction or the other. In this way, servomotor 32 is prevented from searching and the life span of the servomotor is thereby improved. Also, the output reading is maintained steady.

One application of the present invention is in conjunction with a differential refractometer in which a pair of photocells sense the index of refraction of a liquid. The photocells are moved so that the light impinging on them falls equally on each of them. A servomotor such as motor 32 is actuated whenever light falls more on one photocell than on the other to move the photocells until the light is equally balanced on each photocell. The invention of the present application is particularly applicable to controlling the servomotor of such a refractometer. In such an instance, it has been found that the refractometer and servomotor are particularly well controlled without resulting searching of the refractometer by biasing the output from the collectors of transistors 68 and 70 at about 5.5 volts, and choosing 7.5 volt Zener diodes 20 and 22. In such a circuit, as is obvious to one skilled in the art, the motor will not be actuated until there is a potential difference of 4 volts between the output of the differential or push-pull circuit.

Whereas the invention has been described with reference to the use of Zener diodes to control the operation of motor 32, it is obvious that other biasing means could be used. For example, batteries biased against the output from amplifier 18 could be used in place of Zener diodes 20 and 22. A biasing means on the output from the differential amplifier 18 is intended to describe any device which will prevent current from flowing from amplifier 18 to either switches 20, 26 or 30 until a predetermined threshold voltage is developed across the outputs from the amplifier 18.

Reasonable variation and modification are possible within the scope of the foregoing disclosure, drawings, and claims to the invention without departing from the spirit thereof.

I claim:
1. A servomechanism actuating means for use with a servomotor having forward and reverse operational modes, said servomotor having three electrical terminals, the first of which is connected to one terminal of an alternating current power source, comprising:
  a signal developing means to produce a signal indicative of the mode and magnitude of operation required of said servomechanism;
  operating means comprising a differential amplifier which utilizes the signal from said signal developing means to actuate said servomechanism;
  first control means to independently control the minimum signal magnitude required of said signal developing means to instigate operation of said servomechanism in said forward mode, said first control means comprising a first switching means, a first resistor, and a first Zener diode connected at its anode to the first output terminal of said differential amplifier and at its cathode to said first switching means and through said first resistor to a common electrical connection of said differential amplifier and the common second terminal of said alternating current power source, said first switching means being connected between the second terminal of said servomotor and the alternating current common connection so as to allow current to flow through the forward winding of said servo motor when Zener breakdown of said first Zener diode occurs; and
  second control means to independently control the minimum signal magnitude required of said signal developing means to instigate operation of said servo mechanism in said reverse mode, said second control means comprising a second switching means, a second resistor, and a second Zener diode connected at its anode to the second output terminal of said differential amplifier and at its cathode to said second switching means and through said second resistor to the common electrical connection of said differential amplifier and the common second terminal of said alternating current power source, said second switching means being connected between the third terminal of said servomotor and the alternating current common connection so as to allow current to flow through the reverse winding of said servomotor when Zener breakdown of said second Zener diode occurs.

2. A servomechanism actuating means for use with a servomotor having forward and reverse operational modes, said servomotor having three electrical terminals, the first of which is connected to one terminal of an alternating current power source, comprising:
  a signal developing means to produce a signal indicative of the mode and magnitude of operation required of said servomotor;
  operating means comprising a differential amplifier having first and second outputs and operational upon the signal from said signal developing means;
  first control means to independently control the minimum signal magnitude required of said signal developing means to instigate operation of said servomechanism in said forward mode, said first control means comprising a first Zener diode connected at its anode to said first differential amplifier output, a first controlled rectifier with its gate terminal connected to the cathode terminal of said first Zener diode, a second controlled rectifier connected at its anode to the cathode of said first controlled rectifier and at its cathode to the anode of said first controlled rectifier and the common second terminal of the power supply to said servomotor, a second Zener diode, a first capacitor, and a first resistor, said second Zener diode being connected at its cathode to the cathode of said first controlled rectifier, the anode of said second controlled rectifier and one terminal of said first capacitor, the other terminal of said first capacitor being connected to the anode of said second Zener diode, one terminal of said first resistor and the second terminal of said servomotor, the other terminal of said first resistor being connected to the gate of said second controlled rectifier; and
  second control means to independently control the minimum signal magnitude required of said signal developing means to instigate operation of said servo mechanism in said reverse mode, said second control means comprising a third Zener diode connected at its anode to said second differential amplifier output, a third controlled rectifier with its gate terminal connected to the cathode terminal of said third Zener diode, a fourth controlled rectifier connected at its anode to the cathode of said third controlled rectifier and at its cathode to the anode of said third controlled rectifier and the common second terminal of the power supply to said servo motor, a fourth Zener diode, a second capacitor, and a second resistor, said fourth Zener diode being connected at its cathode to the cathode of said third controlled rectifier, the anode of said fourth controlled rectifier and one terminal of said second capacitor, the other terminal of said second capacitor being connected to the anode of said fourth Zener diode, one terminal of said second resistor and the third terminal of said servomotor, the other terminal of said second resistor being connected to the gate of said fourth controlled rectifier.

3. The actuating means of claim 2 wherein said signal developing means comprises a bridge circuit having a plurality of photoelectric devices in the arms thereof and arranged so that the output of said bridge circuit is representative of the difference in the amount of light striking said photoelectric devices.

References Cited

UNITED STATES PATENTS

| | | | |
|---|---|---|---|
| 3,127,550 | 3/1964 | Gilbreath et al. | 318—331 |
| 3,369,160 | 2/1968 | Koppel et al. | 318—28 XR |
| 3,183,425 | 5/1965 | Slawson | 318—227 |
| 3,286,148 | 11/1966 | Henderson | 318—207 XR |
| 3,302,085 | 1/1967 | Hulls et al. | 318—207 |
| 3,327,186 | 6/1967 | Gregory et al. | 318—28 |
| 3,340,785 | 9/1967 | Adler et al. | 318—28 XR |

B. DOBECK, Primary Examiner

U.S. Cl. X.R.

318—28, 207